United States Patent

[11] 3,609,343

| [72] | Inventor | Mark K. Howlett<br>Santa Ana, Calif. |
|---|---|---|
| [21] | Appl. No. | 805,971 |
| [22] | Filed | Feb. 13, 1969 |
| [45] | Patented | Sept. 28, 1971 |
| [73] | Assignee | Poly-Optics, Inc. |

[54] DECORATIVE LIGHT DISPLAY
10 Claims, 5 Drawing Figs.

[52] U.S. Cl. .................................................... 240/10,
119/5, 240/1 EI, 240/2, 350/96 B
[51] Int. Cl. ..................................................... F21s 5/00,
A47q 33/06
[50] Field of Search ........................................ 240/10, 10
T, 2, 1 EI; 350/96, 96 B; 119/5

[56] References Cited
UNITED STATES PATENTS

| 3,532,874 | 10/1970 | Rosenast ..................... | 350/96 B X |
| 3,536,908 | 10/1970 | Oster ........................... | 240/10.1 |
| 3,016,785 | 1/1962 | Nadany ........................ | 240/2 EI |
| 3,018,362 | 1/1962 | Joyce ........................... | 240/1 EI |
| 3,431,410 | 3/1969 | Dolan et al. ................. | 240/10 |

*Primary Examiner*—Samuel S. Matthews
*Assistant Examiner*—Michael Harris
*Attorney*—Nilsson, Robbins, Wills & Berliner ABSTRACT: A light display for use within a fishtank or the like for decorative or lighting purposes, the tank having a viewing area sufficiently translucent to allow a view therethrough of its contents, wherein there are provided a plurality of optical fibers with their light-emitting end faces toward the viewing area. A light source is positioned adjacent the opposite ends of the fibers and an opaque sheath is provided extending from the light source to the directing means.

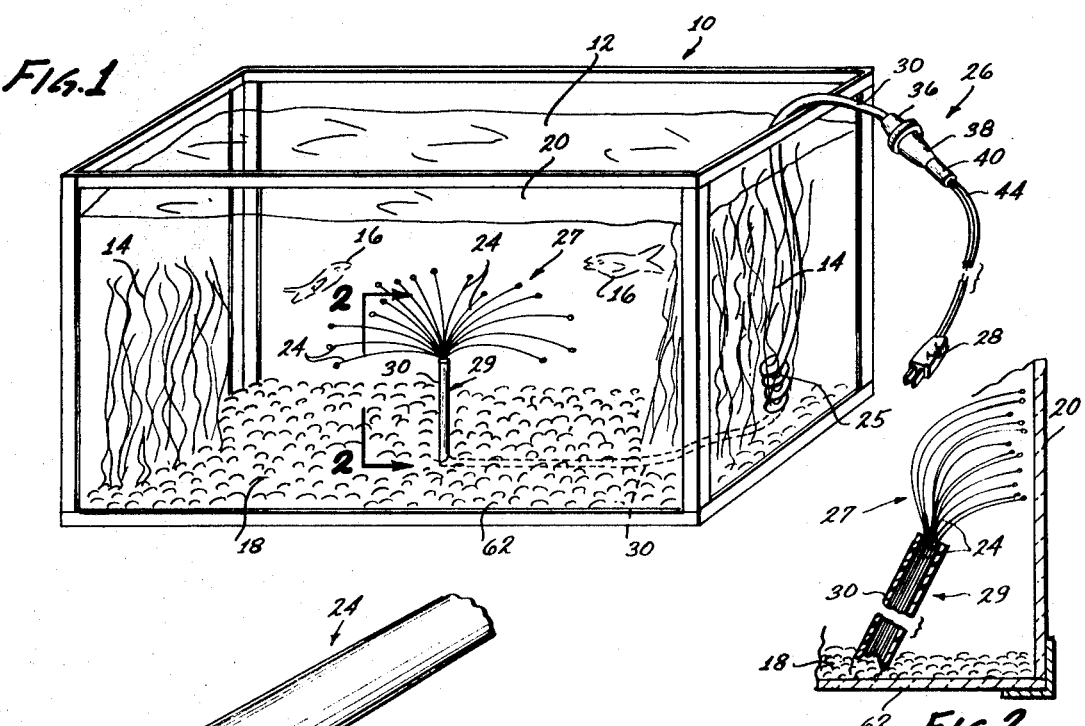
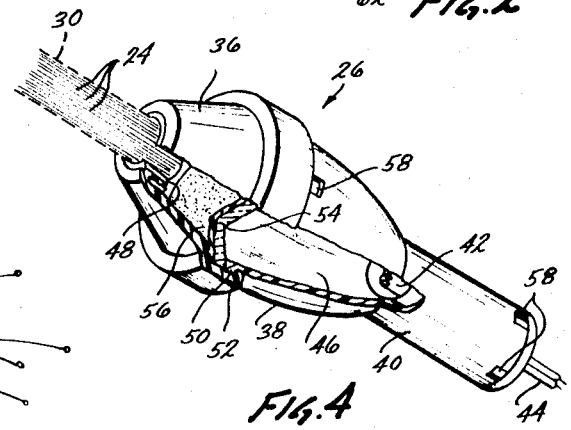
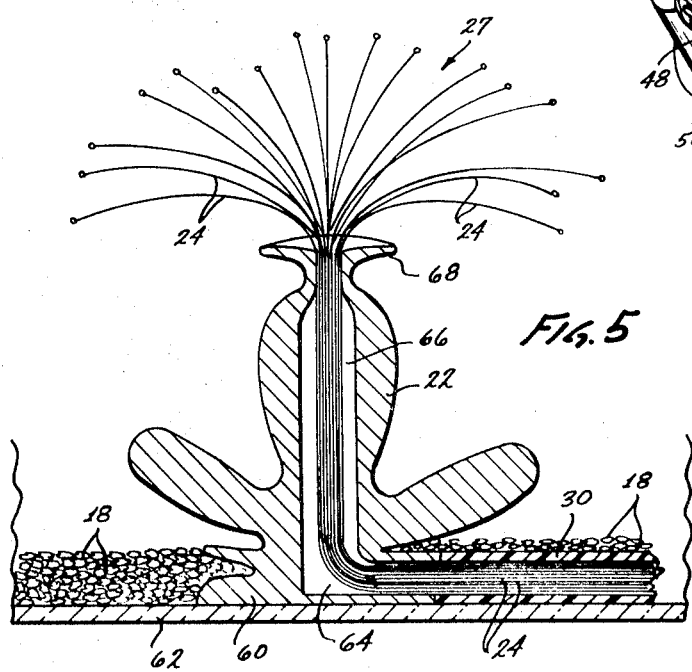
INVENTOR
MARK K. HOWLETT
Nilsson Robbins
ATTORNEYS 3,609,343

DECORATIVE LIGHT DISPLAY

BACKGROUND OF THE INVENTION

1. Field of the Invention

The fields of art to which the invention pertains include the fields of optics and radiant energy, particularly with respect to light-conducting rods, such as optical fibers and decorative lights.

2. Description of the Prior Art

It is often desirable to provide light within a fishtank for decorative or illumination purposes. A number of problems are encountered, particularly when fish are collected therein that are very sensitive to their environment, for example, tropical fish. The temperature of the water must be very accurately maintained within narrow and upper lower limits and any item of a foreign nature which is placed into the water must be constructed of a material which will not in any way contaminate the water and to which the fish are not sensitive. There should be no contact between electrical power lines and the water to preclude the possibility of electrical shock and damaging current drains. Any material that is placed into the water must be resistant to the chemicals utilized to clear algae from the water, such as dilute bleach solution. Further, the item placed in the water to provide a decorative light or illumination should not be visible except in so far as its decorative or illumination aspects.

SUMMARY OF THE INVENTION

The present invention provides a source of cold light which may be placed directly into a tank of water containing for example, tropical fish, with no deleterious effects and which solves all of the foregoing problems. A decorative light display is provided comprising a tank for holding a liquid and having a viewing area, e.g., on a wall thereof, sufficiently translucent to allow a view therethrough of the contents of the tank, a plurality of optical fibers with light-emitting ends within the tank below the desired level of the liquid and a light source for the optical fibers at the other end thereof. Means can be provided within the tank for directing the placement of the optical fibers with their light-emitting ends toward the viewing area. The light source is positioned to be disposed out of the liquid so that only the contact with the liquid is by the cold fibers and directing means. The directing means can have any desired geometrical configuration, e.g., decorative statuary such as a frog, a castle, etc., having at least one opening for receiving the plurality of optical fibers and at least a second opening through which the light-emitting fiber ends extend, the second opening being formed to direct the faces of the light-emitting ends toward the viewing wall of the tank. The optical fibers are housed within a sheath which may be opaque to preclude light leakage that might otherwise occur and which may be colored in such manner as to blend with foliage in the tank and therefore not be readily visible. A color filter can be utilized between the light source and the optical fiber ends. In other particular aspects, the light source is contained within an illumination member which is constructed to hold the light-receiving faces of the optical fibers at a predetermined position with respect to the light source.

Another problem encountered in the utilization of optical fibers, particularly of the polymer type, is that a balance must be struck between flexibility of the fibers and light-emitting capability. The fibers must be sufficiently flexible to allow the formation of decorative spray shapes in a variety of forms, and yet the fibers must emit sufficient light to be decoratively aesthetic. I have discovered that to obtain an aesthetically attractive display one should utilize optical fibers wherein each has a diameter of at least 7 mils. An aesthetic balance between flexibility and intensity of light emission is not obtained with optical fibers of smaller diameter than 7 mils.

In yet another embodiment, the optical fibers are formed with one or more helical bends therein to allow extension of the fiber bundle. The helical bends can be formed by disposing the fibers in a rigid form of desired internal configuration, e.g., helical configuration, the form having a higher melting point than the fiber, raising the temperature of the form sufficient to soften the fiber and then cooling the form to set the fiber to the desired helical configuration.

BRIEF DESCRIPTION OF THE DRAWINGS

FIG. 1 is a plan view of a fishtank containing a decorative light display of this invention;

FIG. 2 is a cross-sectional view of the sprayed fiber ends of the fibers shown in FIG. 1, taken on line 2—2 of FIG. 1, in the direction of the arrows;

FIG. 3 is a perspective view of an optical fiber utilized in this invention;

FIG. 4 is a perspective view of an illumination member utilized in this invention; and FIG. 5 is as cross-sectional view of decorative statuary utilized in this invention.

DESCRIPTION OF THE PREFERRED EMBODIMENTS

Referring to FIG. 1, there is shown generally a fishtank 10 containing water 12 within which there is disposed various marine growth 14 which may be either real or of various plastic material presently known, and fish 16. Disposed within the bottom of the tank is gravel 18 or other such material which simulates the bottom of an area within which typical marine life and fish might live. At least one wall 20 of the tank 10 has a sufficiently translucent area thereon to allow a view therethrough of the contents of the tank, at least with appropriate lighting therein.

A plurality of optical fibers 24 are disposed in the tank 10. The optical fibers 24 are illuminated, as will described, by a light source 26 positioned out of the water 12, in this case outside the tank 10, and is provided with a cord and plug 28 for connection to a source of current. The optical fibers 24 are encased in a sheath 30 extending from the light source 26 to sprayed ends 27 thereof. The sheath 30 may be opaque to preclude any light leakage which might otherwise occur. The opaque sheath 30 may be colored in such a manner as to blend with the foliage 14 and therefore not be visible. The sheath 30 and optical fibers 24 are disposed within the tank 10 so that they underlie the gravel 18.

The bundle of optical fibers 24 is treated so as to have certain desired configurations set therein. As illustrated in FIG. 1, the optical fiber bundle 24 and encasing sheath 30 are provided with a plurality of helical bends 25 along the lengths thereof. By such means, the fiber bundle can be extended in length so as to readily adapt itself to fit the height of a variety of fishtanks of varying lengths. Referring to FIG. 2, the terminal end 29 of the optical fiber bundle 24 and encasing sheath 30, adjacent the sprayed ends 27 of the fibers, is also preset so as to direct the fiber spray 27 with a large portion of the end faces thereof toward the viewing area of the wall 20.

The present can be obtained by disposing the bundle of fibers 24 in a rigid form of the desired internal configuration. For example, a tube of metal, or other material of higher melting point than the fibers 24 and sheaths 30, can be provided having a plurality of helical bends therein. The fibers and sheath can be threaded through the tube and the tube emerged in a tank of near-boiling water. With the optical fibers described further herein and a sheath 30 of polymethylmethacrylate, the heat will soften the fiber 24 and sheath 30. After a predetermined time, e.g., 15 or 20 seconds, the tubular form is then emerged into a bath of cold water to set the sheath fiber. The sheathed fiber can then be withdrawn from the tube and will assume the shape described in FIG. 1. An end portion of the tube can be shaped internally to provide the canted configuration of the sheath fiber end 29 adjacent the spray 27 of fibers as shown in FIG. 2.

Referring to FIG. 3, each optical fiber 24 comprises a central light-conducting core 32 encased within a light-reflecting jacket 34. The optical fiber 24 is constructed of materials well known to the art wherein the light-conducting core 32 has a higher index of refraction than the jacket 34. For example, a core 32 can be formed of polystyrene having an index of refraction of 1.60 and the jacket 34 can be formed of a polymethylmethacrylate having an index of refraction of 1.49. Methods for forming such fibers are well known in the art.

A balance must be struck between flexibility of the fibers and light-emitting capability. The fibers must be sufficiently flexible to allow the formation of decorative spray shapes in a variety of forms, and yet the fibers must emit sufficient light to be decoratively aesthetic. I have discovered that to obtain an aesthetically attractive display one should utilize the optical fibers wherein each has a diameter of at least 7 mils. An aesthetic balance between flexibility and intensity of light emission is not obtained with optical fibers of smaller diameter than 7 mils.

As a light source 26, one can utilize an illumination device disclosed in application Ser. No. 762,832, by J. P. Bruce and R. S. Rosenast, filed Sept. 26, 1968. Such a device is illustrated in FIG. 4 of the present drawing and includes a housing having an anterior member 36 and a posterior member 38. The posterior member 38 terminates in a shank portion 40 which houses a small light bulb 42 and socket therefor (not shown). An electrical cord 44 operatively associated with the socket protrudes rearwardly from the shank portion 40. The bulb 42 is positioned within the posterior member 38, but forwardly of the shank portion 40 thereof.

The posterior member 38 of the housing is shaped elliptically, that is, a longitudinal cross section thereof as in the form of a section of an ellipse. The entire housing is coated inside and out with a highly light-reflecting material, such as aluminum, so that there is provided an elliptically shaped reflective inner surface 46 in the posterior member 38 to concentrate light from the bulb 42 to a forward point of the anterior member 36. This point corresponds to the position of the bundled ends of the optical fibers 24. The bundled fibers 24 are secured at the forward end of the anterior member 36 within a ribbed cylindrical member 48 defining a ribbed opening thereat for receiving the bundled ends of the optical fibers 24.

The forward end of the posterior housing member 38 is provided with an annular flange 50 thereon which fits within an annular groove 52 on the inner surface of the anterior housing member 36 adjacent to the rearward end thereof and abuts the rear edge of the grooved material. The groove 52 is wide enough to accommodate not only the relatively narrow flange 50, but also a somewhat thicker disk 54 and a thin circular color filter 56. The disk 54 is of clear glass or plastic and is operable to pass light therethrough while reflecting heat from its rear surface. The disk 54 and filter 56 are secured within the groove 52, pressed therein by the posterior housing member flange 50. Any of a variety of color filters 56 can be utilized to provide any color of light desired at the tips of the optical fibers 24, or a filter having a plurality of colors thereon can be utilized for special effects. The filter 56 can be omitted and only a clear heat-reflecting disk 54 utilized; alternatively, the heat-reflecting disk 54 can be made of light-filtering material and function both as a light filter and heat reflector to thereby impinge light of desired color on the bundled ends of the optical fibers 24. A plurality of vent openings 58 are disposed around the flanged forward end of the posterior housing member 38 and rear end of the shank portion 40 to facilitate the flow of air and cooling of the light source. The opaque sheath 30 is shown in shadow disposed around the bundle of optical fibers 24.

Means other than the preset described above can be provided within the tank 10 for directing placement of the light-emitting ends of the fibers 24 with the end faces toward the viewing area of the tank wall 20. For example, the light-emitting ends of the bundle of optical fibers 24 can be secured by means of a metallic ring and extend as a spray therefrom with the fibers 24 cut or bent in such a way that the light-emitting ends thereof are most visible form the viewing window 20. In a particular embodiment of this invention, the optical fibers 24 are disposed through decorative statuary 22 as shown in cross section in FIG. 5. Referring to FIG. 5, the statuary 22 is provided having any desired configuration, in this case a typical frog normally used to hold flowers in place, or the like. The statuary has a base 60 sitting on top of the tank bottom wall 62 and defining a horizOntally bored hole 64 communicating with a vertically bored hole 66 in the remainder of the statuary. The vertical hole 66 communicates exteriorly of the statuary 22 through a flared portion 68 at the top thereof. The opaque sheath 30 extends from the light source 26 to the edge of the base 60 and the optical fibers 24, bundled therein extend into the horizontal chamber 64 through the vertical chamber 66 and out through the flared portion 68. At that point, the bundled fibers 24 flare outwardly to form a spray 27 of fibers and are cut and bent so that a large proportion of the optical fibers 24 have their end faces toward the viewing area of the wall 20. If there is more than one wall sufficiently transparent to view the contents of the tank 10, then the spray of fibers 24 can be disposed so that each such viewing wall is faced with a substantial portion of light-emitting fiber ends. The flared portion 68 of the statuary 22 can have any desired configuration and aids in directing the fibers 24 to any desired form.

By providing the optical fibers 24 opaque sheath 30 and light source 26 in the manner described, a decorative display of cold light is obtained which may be placed directly into the water of a tank containing tropical fishes with no deleterious effects.

What is claimed is:
1. A decorative light display, comprising:
   a tank for holding a liquid and having a viewing area sufficiently translucent to allow a view therethrough of the contents of said tank;
   a plurality of flexible optical fibers, having light-emitting ends and light-receiving ends;
   means for supporting said fibers for disposition of said light-emitting ends within said tank below the desired level of said liquid;
   means for bundling said light-receiving ends; and
   a light source outside said tank in light communication with said light-receiving fiber ends for illuminating said optical fibers.
2. The display of claim 1, wherein said light-emitting fiber ends are flared out to form a decorative spray.
3. The display of claim 2, wherein said fiber ends are disposed so as to face said viewing area.
4. The display of claim 1, wherein said optical fibers are formed with one or more helical bends therein to allow extension thereof.
5. The light-conducting device of claim 9, including a sheath for said plurality of fibers formed with one or more helical bends in correspondence to said fiber helical bends.
6. The display of claim 1, within said directing means comprises a member having at least one opening for receiving said plurality of optical fibers and at least one second opening through which said light-emitting ends extend, said second opening being formed to direct a large portion of the end faces of said light-emitting ends toward said viewing area.
7. The display of claim 1, including color filter means between said light source and said light-receiving optical fiber ends.
8. The display of claim 1, wherein said optical fibers each have a diameter of at least 7 mils.
9. The display of claim 1, including an opaque sheath for said optical fibers extending from said light source to said directing means.
10. The device of claim 1, including an illumination member for holding and illuminating the faces of said light-receiving fiber ends, comprising a housing, a light source within sad housing and means in the path of light from said light source for receiving said second ends.